F. C. HASSE.
CASE FOR PRESSURE GAUGES.
APPLICATION FILED DEC. 16, 1919.
1,435,922.
Patented Nov. 21, 1922.
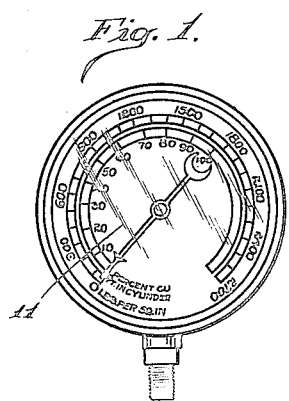
Fig. 1.
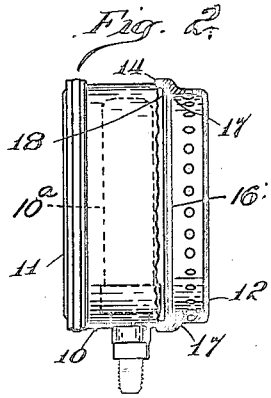
Fig. 2.
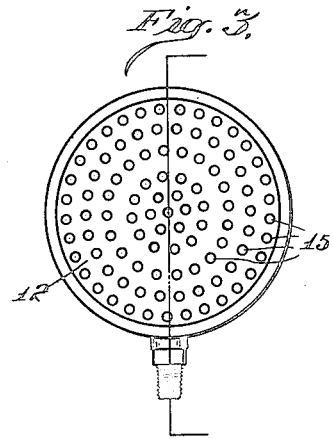
Fig. 3.
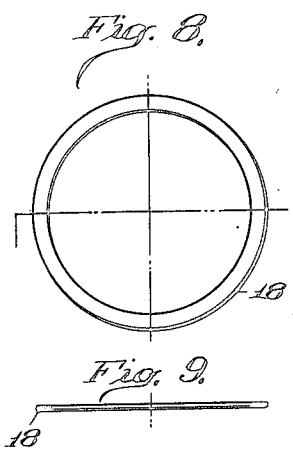
Fig. 8.
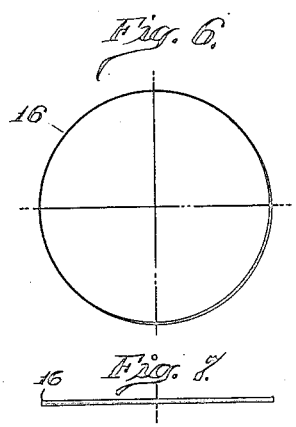
Fig. 6.
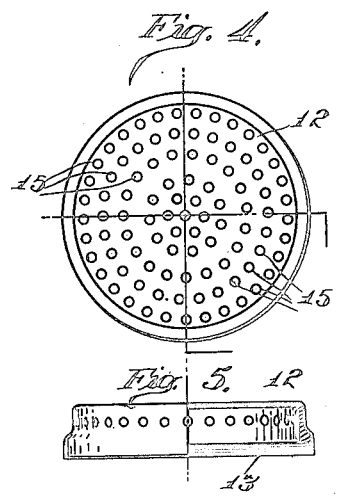
Fig. 4.
Fig. 9.
Fig. 7.
Fig. 5.
INVENTOR
Frank C. Hasse
BY Barnett & Truman
ATT'YS Patented Nov. 21, 1922.

1,435,922

UNITED STATES PATENT OFFICE.

FRANK C. HASSE, OF CONGRESS PARK, ILLINOIS, ASSIGNOR TO THE OXWELD RAILROAD SERVICE COMPANY, OF CHICAGO, ILLINOIS, A CORPORATION OF DELAWARE.

CASE FOR PRESSURE GAUGES.

Application filed December 16, 1919. Serial No. 345,383.

*To all whom it may concern:*

Be it known that I, FRANK C. HASSE, a citizen of the United States, residing at Congress Park, in the county of Cook and State of Illinois, have invented certain new and useful Improvements in Cases for Pressure Gauges, of which the following is a specification.

My invention relates to improvements in casings for pressure gauges, and the principal object of the invention is to provide a casing having means whereby excessive, abnormal internal pressures may be relieved without destroying the casing and any fragments of the gauge mechanism will be arrested within the casing and prevented from flying about in the surrounding space with the consequent liability of causing injury to persons nearby in case the gauge breaks. A gauge of this sort is provided with a crystal or glass face through which movements of the indicating hand may be observed. The gauges are frequently used for measuring very high pressure. The mechanism housed by the casing is necessarily delicate and occasionally gives way under the strains to which it is subjected, which results in the casing being blown to pieces, unless means is provided to relieve the excessive internal pressure.

My invention in its preferred form contemplates providing a perforated back for the casing in order to relieve the execessive internal pressure, and a further object of the invention is to provide means in a casing of this sort which will protect the mechanism housed by the casing. The means employed for this purpose preferably comprises a dust and moisture proof diaphragm, interposed between the body of the casing and the perforated back, the resistance of which is less than that of the glass face of the casing so that in case the mechanism of the gauge gives way under a high pressure, the diaphragm will be ruptured and the pressure relieved by the perforated back without otherwise damaging the casing.

The invention consists in the novel and improved constructions and arrangements, to be hereinafter described and claimed, for carrying out the above stated objects, and such other incidental objects as will appear from the following description of a preferred embodiment of the invention which is illustrated in the accompanying drawing, wherein:

Fig. 1 is a front plan view of a pressure gauge embodying the principles of my invention;

Fig. 2 is a side elevation of the gauge, a portion thereof being shown in cross-section;

Fig. 3 is a back plan view of the gauge.

Fig. 4 is a plan view of the perforated back for the casing of the gauge.

Fig. 5 is a side elevational view of the back for the casing, a portion being shown in section;

Figs. 6 and 7 are detail views of the diaphragm and Figs. 8 and 9 are detail views of a gasket which is preferably interposed between the diaphragm and the back.

Like characters of reference designate like parts in the several views.

The casing for the mechanism of the gauge comprises a cylindrical shell or housing 10, a crystal or glass face 11, and a back member 12. The back member is preferably provided with internal screw threads 13 which are adapted to engage the external threads 14 formed on the shell or body portion 10. Gauges of this sort are ordinarily provided with a pressure member such as the Bourdon tube 10$^a$. The back member 12 is provided with a plurality of small holes 15 which are of sufficient area and numerous enough to permit the pressure in the Bourdon tube of the gauge to escape in case the tube breaks or explodes without destroying or damaging the casing. The casing is designed so that the resistance through the perforated back member is considerably less than that offered by the glass crystal, whereby any destructive pressure will be relieved by the perforations in the back member before the crystal will be forced out or the casing ruptured. The perforations in the back member are relatively small, the back member having sufficient strength to prevent particles of solid material such as fragments of the Bourdon tube and parts of the gauge mechanism from flying into the surrounding space thus preventing injury to any person standing near the gauge when the tube breaks.

In order to prevent dust or moisture from getting into the casing, I preferably provide a diaphragm 16, which is interposed between the shell 10 and the annular shoulder 17 formed on the member 12. This diaphragm may be of any suitable material, but is preferably made of waxed or oiled paper. A gasket 18 is preferably interposed between the shoulder 17 and the diaphragm 16, to prevent defacing the diaphragm when the back member is turned. The diaphragm is securely held around its periphery and the mechanism within the casing is thoroughly protected from dust and moisture. The resistance of the diaphragm is sufficient to enable it to withstand normal pressure, but it is small compared to the other parts of the casing, which permits it to give way when subjected to a slight abnormal pressure, thus relieving the pressure within the casing in the event the Bourdon tube breaks.

It will be obvious that modifications may be made in the construction and arrangement of the parts comprising the casing without departing from the principles of the invention. I do not intend, therefore, to limit the invention to the constructions and arrangements shown and described, except only in so far as certain of the appended claims are so limited.

I claim:

1. A casing for a pressure gauge comprising a housing member for the working parts of the gauge, a face member securely closing the front face of the housing, and a back member firmly secured on the housing, serving to complete the casing, said back member being provided with a plurality of widely distributed openings of small size individually but of comparatively large area in the aggregate for relieving the pressure upon the rupture of a pressure tube in the casing.

2. A casing for a pressure gauge comprising a housing member for the working parts of the gauge, a face member securely closing the front face of the housing, a back member firmly secured on the housing serving to complete the casing, said back member being provided with a plurality of widely distributed openings of small size individually but of comparatively large area in the aggregate for relieving the pressure upon the rupture of a pressure tube in the casing, and a diaphragm capable of being easily ruptured secured in position by said back member for excluding dirt from access into the housing through the openings but adapted to give way readily upon the rupture of the pressure tube.

3. A casing for a pressure gauge comprising a housing, a face member secured thereto, a diaphragm, a gasket, and a back member, said back member being formed with perforations adapted to relieve destructive internal pressure and having threaded engagement with said housing, said diaphragm being interposed between the housing and said back member and adapted to exclude foreign substances from the casing, said gasket being interposed between said diaphragm and said back member, the resistance of said diaphragm being sufficient to withstand normal pressure but insufficient to withstand relatively high pressure from within.

4. In combination with the operating mechanism of a pressure gauge, comprising an element subjected to internal fluid pressure, a casing to enclose said mechanism comprising a face member and a member formed with a plurality of widely distributed openings of small size individually but of comparatively large area in the aggregate for relieving the pressure in said casing in case of the rupture of said element subject to internal pressure.

FRANK C. HASSE.